(No Model.)
J. H. O'DONNELL.
HARNESS HOOK.
No. 350,316. Patented Oct. 5, 1886.
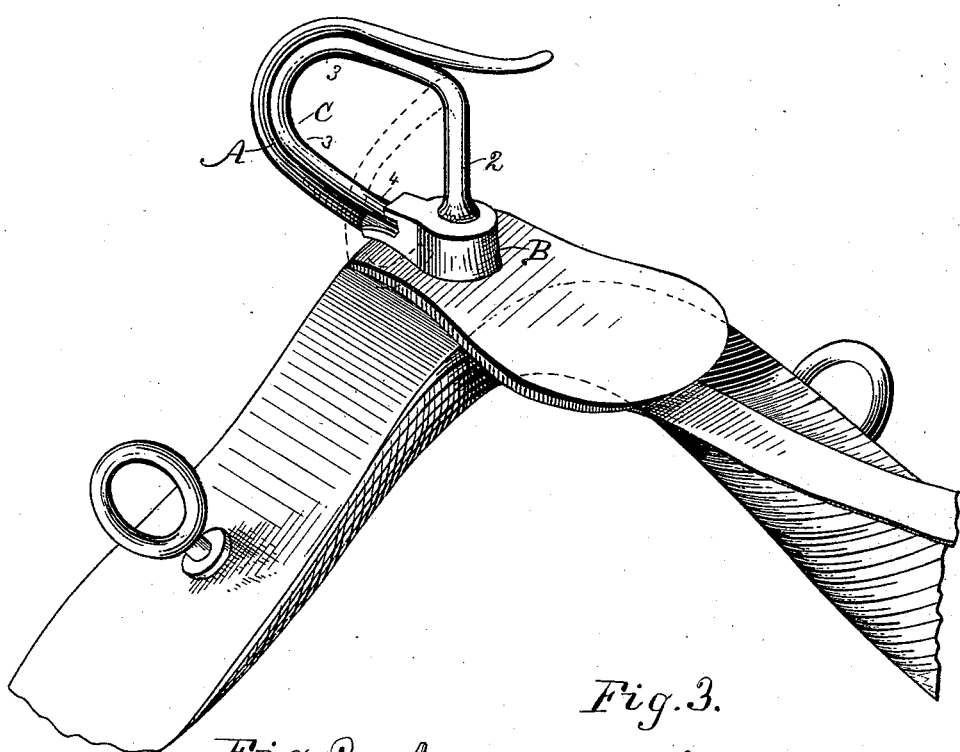
Fig. 1.
Fig. 2.
Fig. 3.
WITNESSES:
Thos. Houghton.
P. B. Turpin.
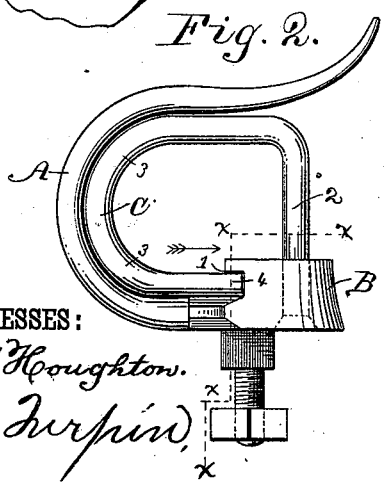
INVENTOR:
J. H. O'Donnell
BY Munn & Co.
ATTORNEYS.
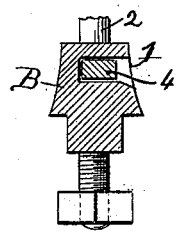

UNITED STATES PATENT OFFICE.

JOHN HARRISON O'DONNELL, OF WINNIPEG, MANITOBA, CANADA.

HARNESS-HOOK.

SPECIFICATION forming part of Letters Patent No. 350,316, dated October 5, 1886.

Application filed March 11, 1886. Serial No. 194,924. (No model.)

*To all whom it may concern:*

Be it known that I, JOHN HARRISON O'DONNELL, of Winnipeg, Manitoba, Canada, have invented a new and useful Improvement in Harness-Hooks, of which the following is a specification.

In the drawings, Figure 1 is a perspective view of my device closed, the latch-hook being indicated open in dotted lines. Fig. 2 is a side view of the device, and Fig. 3 is a cross-section drawn through the lateral notch in the support and showing the point of the latch-hook therein.

The invention is an improvement in hooks intended for use in connection with harness, and is intended especially for use as a check-rein hook, in which connection I will now describe it. The hook proper, A, is extended from a base or support, B, and may be of any suitable shape or design. The base B may be secured to the harness-saddle in any desired manner, as will be obvious. In the forward end of the base or support is formed a lateral notch, 1, opening out of one side of such support and serving to receive the free extremity or point of the latch-hook or open link C. This latch-hook has at its rear end a shank, 2, pivoted to the support, so the said latch may turn in a plane at right angles to that of the hook proper. The curved portion 3 of the latch-hook C is conformed to the curvature of the hook proper and is movable into and out of such hook. The point or free extremity 4 of the latch C is movable into and out of the lateral notch 1, and when in such notch the tension or spring of the latch will act to prevent it from being jarred out of the notch by the motions of the horse, and so cause a disagreeable rattling. This engagement of the point of the latch-hook also serves as a lock by which to secure the latch, and also close its opening, so the rein cannot be released until the latch or link is adjusted to open position. By arranging the latch hook or link to turn at right angles to the plane of the hook proper the latch cannot be released by any throwing of the animal's head, even though the point of the hook be not sprung into the notch 1. It is preferred, however, as a measure of safety to employ the construction as shown and before described.

It will be understood that while the invention is especially intended for use as a check-rein it might be used in other connections for securing portions of the harness together or in hitching such harness, as will be evident to those skilled in the art.

Having thus described my invention, what I claim as new is—

1. The hook, substantially as described, comprising the hook proper and the latch-hook or open link pivotally supported at one end, and having its other end bent into hook-like form conforming approximately to the hook proper and adapted to turn laterally to coincide therewith, substantially as set forth.

2. The combination, with the base or support provided with the hook proper, of the latch-hook or open link having its shank pivoted to the base or support and its curved portion formed to coincide with and movable into and out of the hook proper, substantially as set forth.

3. As an improved article of manufacture, a harness-hook consisting of the base plate or support, having at its forward end the lateral notch, as described, the hook proper, and the latch-hook or open link having its shank pivoted to the support and its curved portion formed to coincide with the hook proper, and having its point movable into and out of the lateral notch in the support, substantially as and for the purposes specified.

JOHN HARRISON O'DONNELL.

Witnesses:
JOSEPH BENJAMIN McARTHUR,
RUPERT WILLIAM DODGE.